Dec. 1, 1925.  1,564,068
W. H. HIGGASON
DIRECTION INDICATOR FOR MOTOR VEHICLES
Filed March 27, 1924
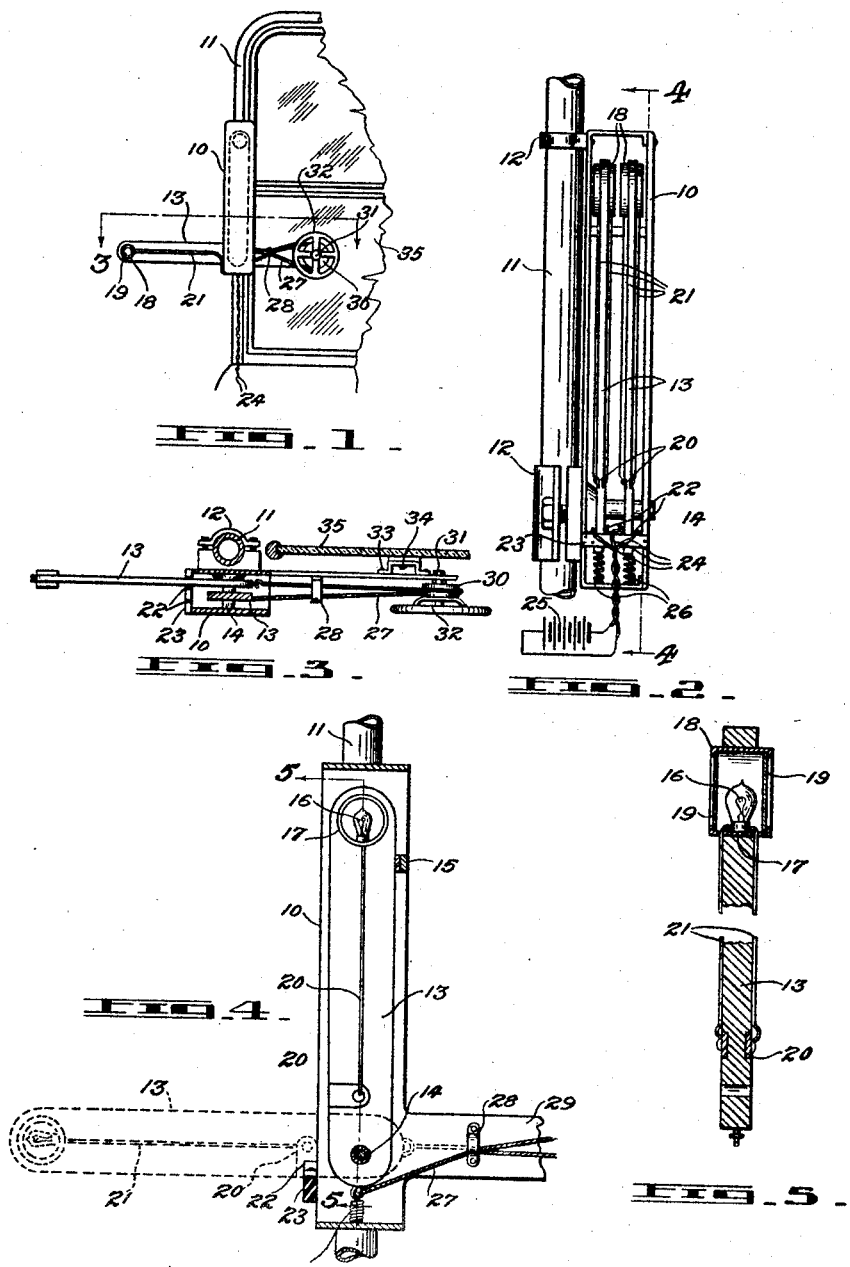
INVENTOR
WILLIAM HENRY HIGGASON
BY *William S. Fowler,*
ATTORNEY Patented Dec. 1, 1925.

1,564,068

UNITED STATES PATENT OFFICE.

WILLIAM HENRY HIGGASON, OF EL CAJON, CALIFORNIA.

DIRECTION INDICATOR FOR MOTOR VEHICLES.

Application filed March 27, 1924. Serial No. 702,389.

*To all whom it may concern:*

Be it known that I, WILLIAM HENRY HIGGASON, a citizen of the United States of America, and resident of El Cajon, in the county of San Diego and State of California, United States of America, have invented certain new and useful Improvements in a Direction Indicator for Motor Vehicles, of which the following is a specification.

This invention has relation to certain new and useful improvements in a direction indicator for motor vehicles and has for its primary object the provision of a direction indicator which may be readily applied to the wind shield frame of a vehicle and easily operated to indicate the direction in which the motor vehicle is to be turned.

The invention has for another object the provision of a direction indicator of the character stated which is composed of the minimum number of parts of simple construction and operation, highly efficient in use and may be readily applied without alteration of the motor vehicle.

The invention has for a further object the provision of a direction indicator of the character set forth in which all of the parts are of compact construction and arrangement and easily operated by hand and designed so as to light the lamp on the signal arm operated when the signal arm is in extended or operated position.

With the foregoing and other objects in view, as will appear as the description proceeds, the invention consists in the novel construction, combination and arrangement of co-operating elements as hereinafter more specifically set forth, claimed and shown in the accompanying drawings forming a part of the present application, in which:

Fig. 1 is a fragmentary elevation of the automobile wind shield and frame with the present invention mounted on the frame.

Fig. 2 is an elevation at right angles to Fig. 1, showing the invention on an enlarged scale.

Fig. 3 is a horizontal transverse section, substantially on the plane of line 3—3 of Fig. 1, looking in the direction indicated by the arrows and showing the parts slightly enlarged.

Fig. 4 is a transverse section substantially on the plane of line 4—4 of Fig. 2, looking in the direction indicated by the arrows.

Fig. 5 is an enlarged detail section taken longitudinally through one of the signal arms, to show the construction thereof, said view being taken substantially on the plane of line 5—5 of Fig. 4, looking in the direction indicated by the arrows.

Referring more in detail to the drawings in which similar reference characters designate corresponding parts throughout the several views, it will be noted that the direction indicator includes a rectangular frame or housing 10 secured removably to the upright of the wind shield frame 11, by double clamping brackets 12, the rectangular frame 10 being supported in upright position, as shown in Figs. 1 to 4 inclusive.

The frame 10 has offset open sides and solid signal arms 13 are pivotally mounted near their lower ends on the supporting shaft 14 which is extended transversely through the frame 10 opposite the lower clamping bracket 12. The signal arms 13 are limited in their pivotal movement by a cross bar 15 in the upper portion of the frame 10 and extending across the inner open side thereof, as clearly shown in Figs. 2 and 4. The signal arms 13 may be of different colours and carry lamps or bulbs 16 in pockets 17 provided near the free ends of the arms 13. The lamp or bulb 16 for each arm 13 is enclosed by the lamp housing 18 secured in the pocket 17 thereof and having transparent side members 19, whereby the light from the lamp or bulb 17 may be seen either from ahead or rearwardly of the vehicle. A metallic member 20 is extended partially around each signal arm 13, near the pivoted end thereof and connected electrically with the lamp or bulb 16 by connecting wires 21. Each metallic member 20 serves as a contact plate which automatically engages in the bifurcated contact member 22 carried by the insulating member 23 secured to the lower portion of the frame 10 and at the open outer side thereof. Therefore, whenever the signal arm 13 is swung downwardly or outwardly on the shaft 14, to horizontal or operative position, as shown by full lines in Figs. 1 to 3 inclusive the contact members 20 and 22 are engaged to complete the circuit through the lamp or bulb 16, owing to current conducting wires 24 extending from the contact members 22 to the magneto or other source of electric energy provided on the motor vehicle, as shown diagrammatically in Fig. 2, the source of electric energy being designated by the numeral 25 and shown conventionally.

Each signal arm 13 is resiliently retained in its normal position within the frame 10, by means of an expansion spring 26 connected by one end to the lower end of the signal arm 13 and by its other end to the bottom of the frame 10, as shown clearly in Figs. 2 and 4. An operating cable 27 is employed for operating either of the signal arms 13 against the action of their respective springs 26. The ends of the cable 27 are secured to the lower ends of the signal arms 13, at the connection of the same with the springs 26. The cable 27 is then extended through the guide 28 provided on the side arm extension 29 of the frame 10. The central portion of the cable 27 is extended around the pulley 30 on the stub shaft 31, projecting laterally from the free end of the extension arm 29. The cable 27 is also secured at its central portion to the pulley 30 and the shaft 31 carries a hand wheel 32 by means of which the shaft 31 may be readily operated to pull either end of the cable 27 and thereby operate the signal arm 13 connected thereto. A bracket member 33 is carried on one face of the extension arm 29 with a shock absorbing member 34 mounted thereon and contacting with the wind shield glass 35 to reduce the vibration to the minimum and thereby prevent injury to the wind shield.

It is believed the complete construction and operation of the direction indicator may now be apparent from the foregoing paragraphs taken in connection with the accompanying drawings, without further detail description. It may be briefly stated, however, that turning of the hand wheel 32 in one direction will cause operation of the signal arm 13 selected for indicating to other parties when the vehicle is to be turned to the left. The rotation of the hand wheel 32 in the reverse direction will likewise cause operation of the other signal arm 13 to indicate that the vehicle is to be turned in the other direction. Drivers and pedestrians will only be required to look for the signals at the one side of the vehicle in order to determine the direction in which the vehicle is to be turned. As soon as the hand wheel 32 is released after operation of one of the signal arms 13, the spring 26 connected to such signal arm 13 will immediately act to return the signal arm 13 to its unoperated or normal position within the frame 10, where it will be out of view and protected.

While the preferred embodiment of the invention has been disclosed, it is to be understood that minor changes in the details of construction, combination and arrangement of co-operating elements may be resorted to within the scope of what is claimed without departing from the spirit of the invention.

What I claim as new is:

A signal of the character described, comprising a vertical frame; dual signal arms pivotally mounted in said frame adapted to be swung laterally downwardly to horizontal position for signalling purposes; means for normally retaining said signal arms in vertical position within said frame; a lateral extension on said frame; a rotatable pulley supported by said extension; a hand wheel for operating said pulley; and a cable trained about said pulley connected to the lower ends of said signal arms for lowering either of said signal arms at will to horizontal signalling position without lowering the associated signalling arm.

In testimony whereof, I affix my signature.

WILLIAM HENRY HIGGASON.